United States Patent [19]

Dawans et al.

[11] 4,404,328
[45] * Sep. 13, 1983

[54] ORGANOMETALLIC POLYMER COMPOSITIONS USEFUL AS CONSTITUENTS OF ANTI-FOULING PAINTS FOR MARINE STRUCTURES AND THEIR METHODS OF MANUFACTURE

[75] Inventors: François Dawans, Bougival; Marguerite Devaud, Mont St. Aignan; Denise Nicolas, Maurepas, all of France

[73] Assignee: Institut Francais du Petrole, Rueil-Malmaison, France

[*] Notice: The portion of the term of this patent subsequent to Apr. 14, 1998, has been disclaimed.

[21] Appl. No.: 208,462

[22] Filed: Nov. 19, 1980

Related U.S. Application Data

[63] Continuation of Ser. No. 935,822, Aug. 22, 1978, Pat. No. 4,262,097.

[30] Foreign Application Priority Data

Aug. 22, 1977 [FR] France .................................. 77 25771

[51] Int. Cl.$^3$ .......................................... C08F 253/00
[52] U.S. Cl. .................................................... 525/274
[58] Field of Search ............................... 525/274, 370

Primary Examiner—Paul R. Michl
Attorney, Agent, or Firm—Millen & White

[57] ABSTRACT

Organo metallic polymer compositions useful as constituents of anti-fouling paints for marine structures, comprising a main chain consisting of a chlorinated polymer of a conjugated diene monomer such, for example, as a chlorinated polybutadiene of high 1, 2 units content, and at least one grafted chain formed at least partly of recurrent units having a pendant organotin group or tin salt function, wherein the grafted chains also contain recurrent units derived from at least one hydrophilic non-metallic unsaturated organic monomer.

13 Claims, No Drawings

ORGANOMETALLIC POLYMER COMPOSITIONS USEFUL AS CONSTITUENTS OF ANTI-FOULING PAINTS FOR MARINE STRUCTURES AND THEIR METHODS OF MANUFACTURE

This is a continuation of application Ser. No. 935,822 filed Aug. 22, 1978 now U.S. Pat No. 4,262,097.

This invention concerns a method and compositions for the treatment of submerged surfaces, such as marine structures or ship hulls, in order to obtain a long-life protection against corrosion and fouling by sea organisms, while reducing the environmental pollution to a minimum.

More particularly, the invention relates to the production of new polymer compositions by grafting biocidic metal compounds chemically bonded or combined on a film-forming polymer, constituting a pellicle which is suitable as coating for marine structures.

It is well-known that the growth of sea organisms (micro- or macro-fouling matters) on the submerged parts of a structure may have detrimental effects on their operation and their corrosion rate. For example, in the techniques of oil production at sea, the fouling may accelerate the corrosion of submerged structures such as supports of drilling platforms. The weight increase resulting from the deposit of the fouling matter also results in difficulties when raising up certain submerged structures, as it is the case for the pipe-lines used to collect oil at sea; it also requires frequent operations for the maintenance of the floats and signalization or meteorologic buoys. On the other hand, the formation of a very thin layer of microfouling is sufficient for reducing the transmission of light and sound and, consequently, for disturbing the operation of certain devices such as sonar sea-marks. The fouling matter may also be a medium favourable to the proliferation of certain microorganisms responsible for the biodegradation of organic materials and of concrete. It is also known that the cooling systems for plants and power stations, either of the nuclear or of the conventional type, operated with sea water, are also subjected to severe fouling which is liable to plug definitely the ducts and condensors. Finally, the fouling and, more particularly, the barnacles, the balani, the serpulae and the algae, increase the roughness of the hull of the ships and their drag in water, by friction effect, thereby resulting in an increase of the fuel consumption for their propulsion and/or a reduction of the ship speed. These various problems and their consequences emphasize the importance of the anti-fouling action.

Besides the periodic cleaning of the surfaces or the use of paints enabling a controlled exfoliation, which are very expensive remedies, the principle of the anti-fouling action is to create a toxic zone on the surfaces to be protected: for example, in sea-water ducts, chlorine is used successfully in a continuous manner, but this technique is obviously unsatisfactory as far as the preservation of the natural environment is concerned.

An efficient way of combatting fouling must comprise the maintenance of the toxic product at an efficient and homogeneous concentration and in a continuous manner on the whole surface. This is the reason why the so-called "anti-fouling" paints have taken an important place among the anti-fouling means.

Thus, in order to fight against the growth of sea organisms on submerged surfaces and hulls of boats, an anti-fouling paint is generally applied as an upper layer. According to the known techniques, this anti-fouling paint contains a toxic substance which slowly reacts with sea-water to give a salt soluble in water and which is lixiviated from the paint pellicle. Among the toxic substances, which are the most commonly used, there can be mentioned cuprous oxide, tin tri-n-butyl oxide, tin tri-n-butyl fluoride and tin tri-n-butyl sulfide, these compounds being biocidic agents very active against a wide range of sea organisms. However, the lixiviation process cannot, in these cases, be controlled uniformly. Generally, it is much too fast immediately after a submerged structure has been put into service, with, as a consequence, the initial presence, near the material to be protected, of very high concentrations of toxic matters, higher than those required, which result in a loss of toxic agent and in pollution of the environment and, thereafter, the presence of lower concentrations of toxic materials than those necessary to obtain an efficient protection, which result accordingly in the accumulation of sea-organisms.

Moreover, as a result of the lixiviation, the paint becomes rough when ageing and then exhibits a surface on which the sea organisms adhere more easily. Consequently, the best of these anti-fouling paints are those which succeed in delaying the mass invasion of the submerged surfaces during more or less long periods, but they do not solve the problem of roughness of the paint coating itself which increases during this period and is not removed by a new paint coating. For example, the final coating of the submerged surface of a boat shows unevenesses resulting from its process of application and it is then liable to be destroyed or to peel off when in service, which still increases the roughness of the hull, so that the ship performances are reduced even if fouling is avoided.

In view to obviate these disadvantages, a recently proposed solution of the prior art consisted of applying a surface coating containing a polymer wherein the toxic groups are chemically combined, thereby decreasing, as a general rule, the lixiviation rate of the biocidic compound in the aqueous phase and accordingly, extending the life time of the paint. These biocidic coatings generally contain organo tin compounds chemically bonded to the polymer substrate through a hydrolysable ionic bond. They essentially consist of polyesters or polyepoxide resins containing organo-tin derivatives or metal salts, as proposed, for example, in the French patent specification Nos. 2,266,733 and 2,307,857 and the U.S. Pat. Nos. 3,167,473; 3,684,752 and 3,979,354. These organometallic resins are generally obtained either by polymerization or copolymerization of organometallic unsaturated monomers, or by reaction of a suitable organometallic compound with a resin comprising carboxy groups: these methods have been described, for example, in U.S. Pat. No. 3,016,369 and in Journal of Polymer Science vol. 32 No. 125 (1958), pages 523 to 525.

It is an object of the present invention to provide new organometallic polymeric compositions forming a convenient pellicle acting as on anti-fouling paint and consisting in, or containing, a graft copolymer having a main chain based on a chlorinated conjugated diene polymer that is, a chlorinated polymer of a conjugated diene monomer, obtained by chlorinating a polymer resulting from polymerization of a conjugated diene monomer, and grafts formed, at least partly, of recurrent units comprising an organometallic compound or a metal salt having biocidic properties, the preferred metal being tin.

In the considered graft copolymers, the main chain consists more particularly of a macro-molecule whose average molecular weight by number may be, for example, from 500 to 250,000. It comprises at least one secondary chlorine atom

and at least one tertiary chlorine atom

By way of examples, there can be mentioned the chlorination products of natural rubber and of polybutadienes.

The grafted chains may consist essentially of hydrocarbon recurrent units (referred to as B) comprising one or more organometallic groups of tin or one or more tin metal salt functions, complying with one of the general formulas:

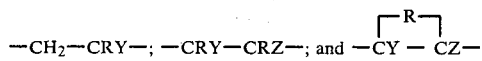

wherein R is a hydrogen atom or an alkyl or alkylidene radical comprising, for example, from 1 to 4 carbon atoms; Y is an organic radical comprising, for example, from 1 to 30 carbon atoms and at least one group of the type —O—Sn, —O—Sn $X_3$, or —O—Sn $R'_3$, wherein X is a halogen atom and R' an aliphatic or aromatic hydrocarbon radical comprising, for example, from 1 to 12 carbon atoms; and Z is an organic radical comprising from 1 to 30 carbon atoms or, optionally, a hydroxy or carboxy group.

Besides the above-defined recurrent units B, the copolymer grafted chains considered in this invention may also contain organic recurrent units (referred to as C) complying with one of the general formulas:

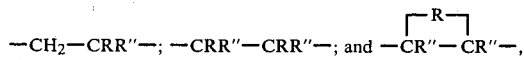

wherein R, defined as above, is a hydrogen atom or an alkyl or alkylidene radical comprising, for example, from 1 to 4 carbon atoms; and R" is a halogen, hydroxy, carboxylic anhydride or acid, ester, amide, nitrile or ether group or an aliphatic or aromatic hydrocarbon radical. When present, the recurrent units C may consist of homopolymer grafted chains separate from the grafted chains formed essentially of recurrent units B, but the possibility may also be considered to have copolymer grafted chains containing both recurrent units B and recurrent units C, statistically distributed.

More particularly, the organometallic polymer compositions of the invention comprise graft copolymers wherein the main chain is selected from products obtained by chlorination of natural rubber or of polybutadienes of high 1,2-units content, which may be represented respectively by the following structures:

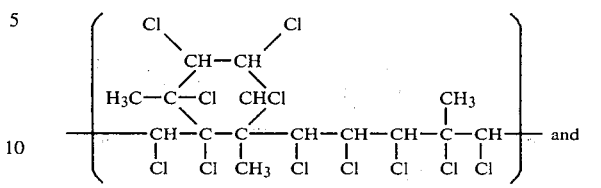

The recurrent units (B) of the grafted chains derive more particularly from ethylenically unsaturated compounds comprising at least one tin or organo-tin carboxylate group. Among the preferred recurrent units (B), there can be mentioned the trialkyltin, triaryltin and triaralkyltin methacrylates. The recurrent units (C), if any, are more particularly derived from ethylenically unsaturated compounds. Among such compounds, there can be mentioned as examples styrene, vinyl chloride, acrylonitrile, acrylamide, acrylic acid, methacrylic acid, methyl methacrylate, glycidyl methacrylate, methyl hydroxyacrylate, hydroxyethyl methacrylate or maleic anhydride.

The anti-fouling graft copolymers of the invention may be obtained by two main methods of preparation.

According to a first method, there is prepared a graft copolymer whose grafts contain carboxylic groups in the form of anhydride, acid or alkali metal salt and it is then reacted with a solution of the convenient tin compound. For example, there is grafted on the chlorinated polymer, through radical linkage, α, β unsaturated carboxylic acids or anhydrides or their sodium or potassium salts, optionally associated with other comonomers polymerisable by radical linkage; then the resulting graft copolymer is reacted with a tin cation or an organo-tin radical to form a metal salt or an organometallic complex. By way of illustration of the preferred compositions of the invention obtained according to this first mode of reaction, there can be mentioned those which result from the grafting of sodium acrylate, acrylic acid, methacrylic acid or maleic anhydride, on chlorinated natural rubber, in the presence of a peroxide followed with the reaction of the grafted copolymer with a tin halide, a trialkyltin hydroxide, $R_3SnOH$, or a trialkyltin oxide $(R_3Sn)_2O$, for example according to the following schemes:

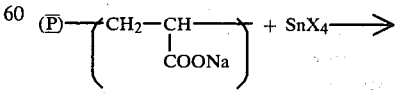

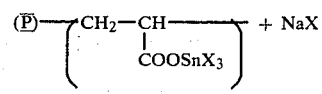

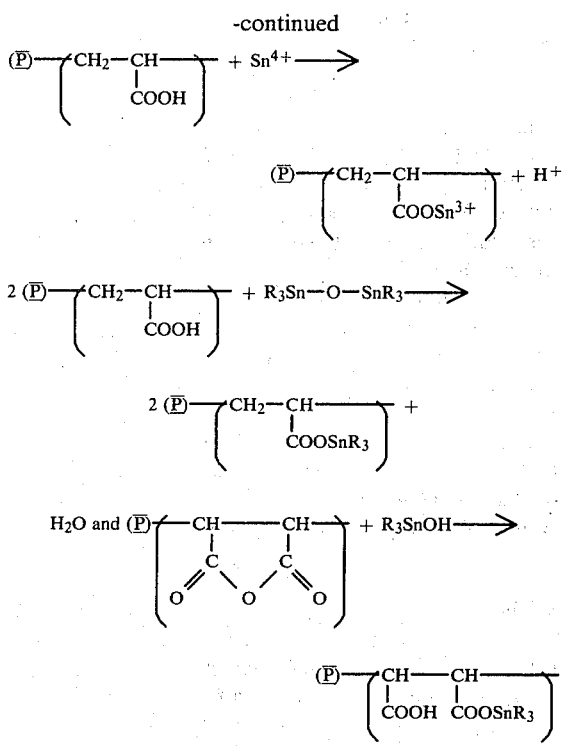

(P)—designating the chlorinated substrate on which are implanted the grafts.

According to a second method of synthesis, there is preformed an organo-tin monomer by reacting an ethylenically unsaturated carboxylic acid or anhydride or an alkaline salt of such an acid with a tin derivative, the resulting monomer being then grafted, for example by radical linkage, on a chlorinated polymer, optionally in the presence of one or more other radicalarly copolymerisable comonomers. As a general rule, the preformed organo-tin monomers usable in this method for the preparation of the compositions of the invention comply with one of the following structures:

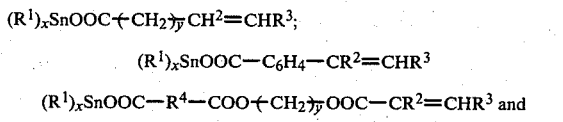

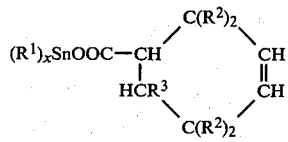

wherein x and y are integers, x having a value from 0 to 3 and y a value from 0 to 6, each $R^1$ being a halogen atom or an alkyl, aryl or aralkyl radical comprising, for example, up to 12 carbon atoms, each $R^2$ being a hydrogen atom or an alkyl radical comprising for example, up to 4 carbon atoms, each $R^3$ being a hydrogen atom or an alkyl radical comprising, for example, up to 4 carbon atoms or a —$OR^2$, —$COOR^2$, —$COOSn(R^1)_x$ group and $R^4$ being an alkyl, aryl or aralkyl radical comprising, for example, up to 8 carbon atoms.

By way of illustration of tin containing monomers which are easily available and which are particularly convenient for being grafted alone or in admixture with one another or with other usual copolymerisable monomers according to the invention, there can be mentioned the trimethyltin, triethyltin, tripropyltin, tributyltin, triphenyltin, tribenzyltin and trineophyltin acrylates or methacrylates (A), the tin maleates (B) or trialkyltin maleates (C), the trialkyltin ethyleneglycolphthalate methacrylates (D), tin tetrahydrophthalate (E), the trialkyltin dimethyldihydrophthalates (F) and the trialkyltin vinylbenzoates (G):

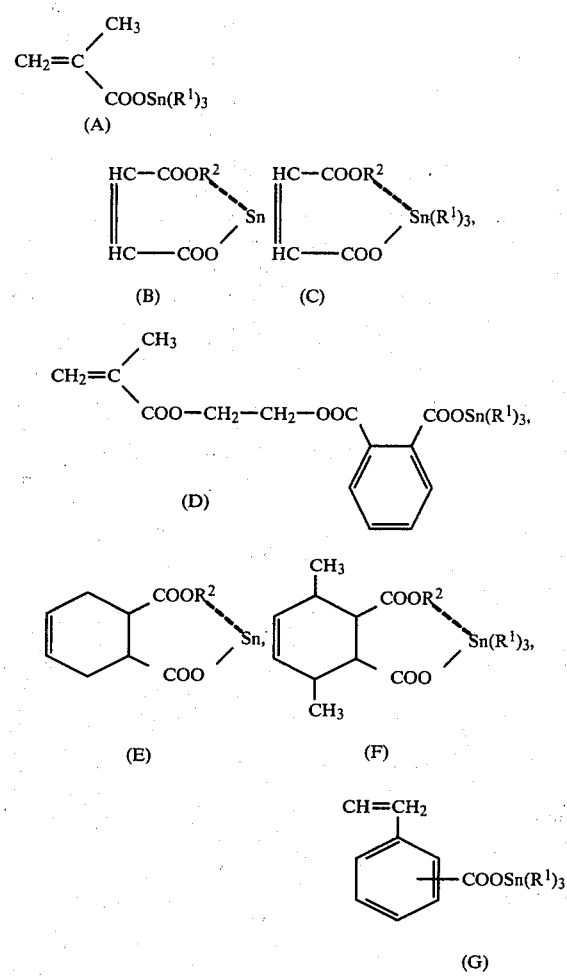

$R^1$ being a —$CH_3$, —$C_2H_5$, —$C_3H_7$, —$C_4H_9$, —$C_6H_5$, —$CH_2C_6H_5$ or —$CH_2$—$C(CH_3)_2$ ($C_6H_5$) radical and $R^2$ being a hydrogen atom or a —$CH_3$, —$C_2H_5$, —$C_3H_7$ and —$C_4H_9$ radical.

The tin content of the graft copolymers of the invention as well as the number of grafts and their length, as represented by the molecular weight of the graft, are variable and are essentially determined so as to obtain a final composition having good film-forming and antifouling properties. By way of non-limitative illustration, the grafted copolymers of the invention contain, for example, from 0.5 to 20% by weight of tin and preferably from 1 to 10% by weight of tin.

Moreover, the number of grafts is generally from 3 to 20, their molecular weight being in the range from 100 to $5 \times 10^6$ and preferably, from 500 to 100,000.

The organometallic copolymers of the invention have generally a chlorine content from 20 to 65% by weight, preferably from 40 to 55%.

As compared to the anti-fouling organometallic polymers of the prior art, the graft organometallic copolymers of the invention offer various advantages; they have good film-forming properties, which makes them more suitable for use as coating; the adherence of the anti-fouling coating on the protecting sub-layers, generally with a base of chlorinated natural rubber, is improved in view of the better compatibility due to the chlorinated nature of the main chain in the grafted copolymers of the invention; the lixiviation rate of the toxic organo-tin compound in the aqueous phase may be better controlled, thereby resulting in a longer life time of the anti-fouling composition of the invention; finally, through a convenient selection of the comonomer included in the grafts according to the invention, it is possible to considerably reduce the pollution of the environment and to increase the biocidic efficiency of the organostannic groups; as a matter of fact, the use of comonomers with hydrophilic properties results in a stabilisation of the water layer at the vicinity of the surface to be protected, thereby avoiding any loss of toxic substances resulting from their too fast diffusion and dilution in the surrounding medium.

The anti-fouling copolymers of the invention form a pellicle and may be applied after solubilization in a suitable solvent, in one or more layers onto the surface to be protected, either by painting or by projection at room temperature. The solvents used for applying the anti-fouling compositions of the invention may be the usual solvents such as white-spirit, similar petroleum derivatives, ketonic solvents such as methylisobutylketone, ester solvents such as ethyl acetate or aromatic solvents such as toluene.

The anti-fouling paint according to the invention may also contain other usual components of an anti-fouling paint as well as various usual additives known in the art such as plasticizers like diisobutyl phthalate or tritolyl phosphate, thickening agents such as bentonite, pigments such as titanium or iron oxides, fillers such as aluminum silicates, drying agents such as cobalt or manganese naphthenate and organic hydrophobic retarding agents to reduce the rate of ion exchange between sea water and the copolymer, such as naphthalene, silicones, dichlorodiphenyltrichlorethane or polybutene of low molecular weight.

The following examples illustrate the invention but they must not be considered in any way as limiting the scope thereof.

EXAMPLE 1

100 g of chlorinated natural rubber containing 65.4% by weight of chlorine are dissolved, under inert atmosphere, in 1 liter of toluene. 100 g of tributyltin methacrylate, $CH_2=C(CH_3)-COOSn(C_4H_9)_3$, is added to this solution and the mixture is stirred and heated to 80° C. There is then added, by small fractions, 2 g of benzoyl peroxide and the reaction mixture is stirred and maintained at 80° C. for 6 hours. The fractionated precipitation of the mixture is achieved by progressive addition of methyl alcohol and there is separately recovered, by filtration, the fraction of the product having a constant composition. This fraction is finally dried under reduced pressure, at 30° C., up to a constant weight. There is so obtained 93 g of copolymer which contains, as shown by elementary analysis, 56.4% by weight of chlorine and 4.3% by weight of tin. This grafted copolymer is thus constituted by 86.2% by weight of a main chain based on chlorinated rubber and 13.8% by weight of grafts based on tributyltin polymethacrylate.

EXAMPLE 2

80 g of the same chlorinated rubber as that used in example 1 are dissolved in 400 cc of xylene. To this solution is added a mixture of 20 g of tributyltin methacrylate, 40 g of styrene and 0.6 g of benzoyl peroxide and the solution is heated to 80° C. for 6 hours. The reaction product is separated by precipitation with methyl alcohol as in example 1. There is obtained 93.5 g of a copolymer containing 53.5% by weight of chlorine and 2% by weight of tin. The quantitative determination of the styrene content, by magnetic nuclear resonance, makes it possible to define the obtained copolymer as being constituted by 81.8% by weight of a main chain based on chlorinated rubber and 18.2% by weight of grafts containing 66% by weight of styrene and 34% by weight of tributyltin methacrylate.

EXAMPLE 3

The diffusion velocity of the organostannic compound of the compositions obtained in examples 1 and 2, has been determined in the aqueous phase, by polarography. For this purpose, a pill of the product (5 to 6×2 cm$^2$) is stirred at 20° C. in 15 cc of a buffered aqueous solution containing 0.5 mole of NaCl and $1\times10^{-3}$ mole of HCl, the protons increasing substantially the lixiviation rate of the organostannic compound. Every day there is determined by polarography, the tin concentration of the aqueous phase which is withdrawn and, at each time, the 15 cc of the aqueous buffered solution are thus renewed. Finally, there is plotted the curve $\Sigma i = f(t)$, i.e.:

First day: height of the polarography wave = $i_1$

Second day: height of the polarography wave = $i_2$, $\Sigma i = i_1 + i_2$

The total number of moles of the organotin compound which has diffused into the aqueous solution is given by the formula:

number of moles = $7.02 \times 10^{-7} \Sigma i$

A few experimental values of $\Sigma i$ are reported in the following Table and they are connected to the anti-fouling efficiency of the coating; the latter is determined by submerging at different depths into the Mediterranean sea (at Port-de-Bouc, where the conditions are particularly favourable to the development of fouling resulting from sea organisms), test pieces of polyvinyl chloride coated on both faces with two layers of compositions of the invention, sprayed in a toluene solution. Every three months, the test pieces are withdrawn for examination and the anti-fouling efficiency is determined, more particularly on the basis of the coating roughness due to the sea organisms. In addition, in view of showing the improved properties of the grafted copolymers of the invention, as compared to similar compositions obtained according to the prior art, a comparison has been made between, on the one hand, (A) a mixture of chlorinated rubber and tributyltin acetate and, on the other hand, (B) a mixture of chlorinated rubber and tributyltin polymethacrylate.

The corresponding results are given in the following Table:

| EXAMPLES | TIN DIFFUSION Σi AFTER | | | ANTI-FOULING ACTION AFTER A 6 MONTHS IMMERSION |
|---|---|---|---|---|
| | 94 h | 238 h | 410 h | |
| According to the prior art | | | | |
| (A) | 8.5 | 15.2 | 21.9 | poor |
| (B) | 5.5 | 9.5 | 15.3 | mean |
| According to the invention | | | | |
| EX (1) | 0.8 | 4.2 | 9.0 | good |
| EX (2) | 2.1 | 4.3 | 12.5 | good |

EXAMPLE 4

Example 1 is repeated with the use of 27 g of triphenyltin methacrylate $CH_2=C(CH_3)—COOSn(C_6H_5)_3$ and 0.5 g of benzoyl peroxide, everything else being otherwise unchanged. In these conditions, there is obtained a grafted copolymer containing 96.9% by weight of chlorinated rubber and 3.1% by weight of grafts based on triphenyltin polymethacrylate. The tin content of the copolymer is close to 1% by weight.

EXAMPLE 5

60 g of chlorinated natural rubber are dissolved into 300 cc of toluene and to this solution is added a mixture of 35 g of styrene, 35 g of tributyltin methacrylate and 0.5 g of azobisisobutyronitrile. The solution is stirred at 80° C. for 20 hours and the product is separated by precipitation into isopropyl alcohol. There is obtained 75 g of a grafted copolymer containing 81% by weight of chlorinated rubber and 19% by weight of grafts containing respectively 55% by weight of styrene and 45% by weight of tributyltin methacrylate.

EXAMPLE 6

100 g of chlorinated natural rubber and 50 g of tributyltin undecenoate, $CH_2=CH—(CH_2)_8—COOSn(C_4H_9)_3$ and dissolved into one liter of xylene. One gram of dicumyl peroxide is added thereto and the mixture is stirred at 120° C. for 8 hours. The resulting product, separated by precipitation into methyl alcohol, contains 10.5% by weight of organostannic grafts.

EXAMPLE 7

139 g of chlorinated natural rubber are dissolved into 690 cc of toluene; to this solution are added 104 g of trineophyltin methacrylate, $CH_2=C(CH_3)COOSn(CH_2—C(CH_3)_2(C_6H_5))_3$, 35 g of styrene and 1.4 g of azobisisobutyronitrile. The mixture is stirred for 6 hours at 80° C. and the formed copolymer is separated by precipitation in methyl alcohol. There is obtained 171 g of a grafted copolymer containing 11.2% by weight of trineophyltin polymethacrylate and 17.8% by weight of styrene.

EXAMPLE 8

60 g of chlorinated natural rubber and 70 g of tributyltin ethyleneglycolphthalate methacrylate, $CH_2=C(CH_3)COO(CH_2)_2OOC—C_6H_4—COOSn(C_4H_9)_3$ are dissolved into 400 cc of toluene. After addition of 1.2 g of benzoyl peroxide, the mixture is stirred at 60° C. for 24 hours. The grafted copolymer, separated by precipitation into methyl alcohol, contains 2.6% by weight of tin.

EXAMPLE 9

To a solution of 60 g of chlorinated natural rubber in 200 cc of toluene, there is added a solution of 70 g of bis-(tributyltin) maleate, $(C_4H_9)_3SnOOC—CH=CH—COOSn(C_4H_9)_3$, 10 g of styrene and 0.8 g of benzoyl peroxide in 200 cc of toluene. After stirring for 6 hours at 80° C., the reaction mixture is precipitated into methyl alcohol. The tin content of the formed grafted polymer amounts to 4.2% by weight.

EXAMPLE 10

100 g of chlorinated 1.2 polybutadiene containing 61.8% by weight of chlorine are solubilized into 500 cc of toluene. A mixture of 25 g of tripropyltin acrylate, $CH_2=CH—COOSn(C_3H_7)_3$ and 25 g of 2-hydroxyethyl methacrylate is added thereto. The mixture is heated at 80° C. and 1 g of benzoyl peroxide is further added. After stirring of the solution, at 80° C. for 6 hours, there is separated, by precipitation into methyl alcohol, a copolymer containing 40.5% by weight of chlorine and 6.6% by weight of tin.

EXAMPLE 11

100 g of chlorinated natural rubber and 30 g of acrylic acid are solubilized into 1 liter of benzene; 0.2 g of benzoyl peroxide is added to the mixture, which is heated at 80° C. for 3 hours. The starting solution, slightly turbid, becomes limpid when hot and then, during the reaction, a precipitate is formed progressively. At the end of the reaction, the product is precipitated into a mixture of methyl alcohol and water (50/50 by volume); the precipitate is separated by filtration and extracted with boiling water so as to remove the non-grafted polyacrylic acid. The residue is then washed with alcohol and dried under reduced pressure up to a constant weight. The chlorine content of the resulting product amount to 55.5% by weight, which corresponds to a grafted copolymer containing 15.1% by weight of polyacrylic acid grafts. This copolymer is solubilized again into dichloromethane and reacted with a stoichiometric amount of tributyltin oxide; the water formed during the reaction is removed by azeotropic distillation and the resulting new copolymer is then separated by precipitation into methyl alcohol. The infrared spectrum of the copolymer shows the presence of free —COOH groups (1725 $cm^{-1}$) and $COOSn(C_4H_9)_3$ function (1650 and 600 $cm^{-1}$). The tin content of the grafted copolymer amounts to 7.2% by weight.

EXAMPLE 12

To a solution of 200 g of chlorinated natural rubber, 15 g of maleic anhydride and 30 g of styrene in 1 liter of dichloroethane, there is added 0.6 g of benzoyl peroxide. The mixture is stirred at 80° C. for 3 hours and then 80 g of tributyltin hydroxide is added thereto and heating is continued for 3 more hours. Then, the reaction mixture is precipitated by addition of methyl alcohol. The copolymer prepared by this way contains 6.3% by weight of tin.

What we claim is:

1. An organometallic polymer composition, comprising a graft copolymer formed of:
   (a) a main chain consisting of a chlorinated polymer of a conjungated diene monomer;
   (b) at least one grafted chain formed at least partly of recurrent units having at least one pendant tin or organotin carboxylate function; and (c) at least one grafted chain containing recurrent units derived from at least one hydrophilic non-metallic unsaturated organic monomer;

wherein said chlorinated polymer of a conjugated diene monomer has a chlorine content such that the final graft copolymer contains from 20 to 65% by weight of chlorine.

2. The composition of claim 1, wherein said recurrent units having at least one pendant organotin carboxylate function are derived from a trialkyltin acrylate or methacrylate.

3. The composition of claim 1, wherein said hydrophilic monomer is hydroxyethyl methacrylate.

4. The composition of claim 2, wherein said hydrophilic monomer is hydroxyethyl methacrylate.

5. The composition of claim 1, wherein the main chain of said graft copolymer consists of the chlorination product of either a polybutadiene of high 1,2-units content or natural rubber, and has a number average molecular weight of from 500 to 250,000.

6. The composition of claim 1, wherein said chlorination product is chlorinated natural rubber.

7. The composition of claim 4, wherein said chlorination product is chlorinated natural rubber.

8. The composition of claim 7, wherein said trialkyltin acrylate is tripropyltin acrylate.

9. The composition of claim 8, wherein said hydrophilic monomer is hydroxyethyl methacrylate.

10. The composition of claim 1, wherein said hydrophilic monomer is acrylic acid.

11. The composition of claim 1, wherein said hydrophilic monomer is methacrylic acid.

12. A composition according to claim 1 which contains from 0.5 to 20% by weight of tin.

13. A composition according to claim 1, containing from 40 to 55% by weight of chlorine and from 1 to 10% by weight of tin.

* * * * *